United States Patent
Kim

(10) Patent No.: US 9,842,396 B2
(45) Date of Patent: Dec. 12, 2017

(54) SYSTEM AND METHOD FOR CALIBRATING CAMERA

(71) Applicant: Samsung Electro-Mechanics Co., Ltd., Suwon-Si (KR)

(72) Inventor: Hyun Kim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/735,490

(22) Filed: Jun. 10, 2015

(65) Prior Publication Data

US 2015/0381892 A1    Dec. 31, 2015

(30) Foreign Application Priority Data

Jun. 30, 2014  (KR) .................. 10-2014-0081088

(51) Int. Cl.
*H04N 5/232*  (2006.01)
*G06T 7/00*  (2017.01)

(52) U.S. Cl.
CPC ......... *G06T 7/0018* (2013.01); *H04N 5/2327* (2013.01); *H04N 5/23254* (2013.01)

(58) Field of Classification Search
CPC .... G02B 27/646; H04N 1/00087; H04N 1/40; H04N 1/32614; H04N 1/32791; H04N 1/32793; H04N 1/32795; H04N 1/32789; H04N 1/32797; H04N 5/2178; H04N 5/3572; H04N 5/23267; H04N 5/23254; H04N 5/2327; H04N 5/23264; H04N 5/2328; H04N 5/23287; H04N 9/045; G06T 5/006; G06T 7/00; G06T 7/0018; G06T 11/005

USPC ........................................ 348/208.6
See application file for complete search history.

(56) References Cited

U.S. PATENT DOCUMENTS

| | | | | |
|---|---|---|---|---|
| 8,279,292 | B2 * | 10/2012 | Watanabe | G02B 27/646 348/208.11 |
| 8,547,440 | B2 * | 10/2013 | Muukki | H04N 5/228 348/208.11 |
| 8,803,983 | B2 * | 8/2014 | Miyazawa | H04N 5/23248 348/208.11 |
| 9,232,138 | B1 * | 1/2016 | Baldwin | H04N 5/23264 |
| 9,319,587 | B2 * | 4/2016 | Takao | H04N 5/23254 |
| 9,420,183 | B2 * | 8/2016 | Hwang | G02B 27/646 |
| 2008/0309772 | A1 * | 12/2008 | Ikeda | G03B 5/00 348/208.7 |

(Continued)

FOREIGN PATENT DOCUMENTS

| | | |
|---|---|---|
| CN | 101263707 A | 9/2008 |
| CN | 101465956 A | 6/2009 |

(Continued)

OTHER PUBLICATIONS

Chinese Office Action dated Sep. 20, 2017 in corresponding Chinese Patent Application No. 201510373434.0. (18 pages in English and 12 pages in Chinese).

*Primary Examiner* — Pritham Prabhakher
(74) *Attorney, Agent, or Firm* — NSIP Law

(57) ABSTRACT

There is provided a system for calibrating a camera including: a memory storing centering calibration data reflecting a deviation of an optical axis of a lens; and an image signal processor determining an image recognition region of an image sensor based on the centering calibration data to process an image signal input from the image sensor.

52 Claims, 3 Drawing Sheets

(56) References Cited

U.S. PATENT DOCUMENTS

| | | | |
|---|---|---|---|
| 2009/0153725 A1 | 6/2009 | Kawahara | |
| 2011/0298888 A1 | 12/2011 | Shimada | |
| 2012/0307089 A1* | 12/2012 | Rukes | H04N 5/232 |
| | | | 348/208.99 |
| 2014/0267809 A1* | 9/2014 | Tsubaki | H04N 5/23287 |
| | | | 348/208.6 |
| 2014/0293004 A1* | 10/2014 | Tsubaki | H04N 5/23287 |
| | | | 348/43 |
| 2014/0375845 A1* | 12/2014 | Lee | G06T 5/006 |
| | | | 348/241 |
| 2015/0130972 A1* | 5/2015 | Liu | H04N 5/3572 |
| | | | 348/251 |

FOREIGN PATENT DOCUMENTS

| | | |
|---|---|---|
| CN | 102326381 A | 1/2012 |
| KR | 10-2013-0043427 A | 4/2013 |
| WO | WO 2007/032558 A1 | 3/2007 |

* cited by examiner

SYSTEM AND METHOD FOR CALIBRATING CAMERA

CROSS-REFERENCE TO RELATED APPLICATION

This application claims the benefit of Korean Patent Application No. 10-2014-0081088, filed on Jun. 30, 2014, entitled "System And Method For Calibrating Camera" which is hereby incorporated by reference in its entirety into this application.

BACKGROUND

The present disclosure relates to a system and a method for calibrating a camera.

Recently, a market of mobile devices such as mobile phones and tablets is growing quickly. As a technical background of the rapid growth of market, the increase in the number of pixels and a pixel size of a display may be indispensably involved.

As the number of pixels of the display of a smart phone is increased, the number of pixels of an imaging camera module which is attached to a rear surface thereof is increased in proportion to the increased number of pixels.

As the number of pixels of the rear camera is increased, a demand for a market for optical image stabilization has been increased. The reason why a demand for the market of the optical image stabilization is increased is that a demand for slimness is no less strong than a demand for a high pixel. That is, despite the increase in the number of pixels, a height of the camera module is inclined to be gradually reduced rather than to be increased. To meet the tendency, the reality is that a pixel size of a sensor is getting smaller. Comparing the sensors in each generation, the pixel size of the sensor in a next generation is approximately 80% smaller than that of the previous generation like 1.75 μm→1.4 μm→1.12 μm and a pixel area of the sensor in a next generation is approximately 64% smaller than that of the sensor in the previous generation. Therefore, the area of the sensor having the pixel size of 1.12 μm is only about 40% smaller than that of the sensor having the pixel size of 1.75 μm, and thus a light quantity received by the sensor having the pixel size of 1.12 μm is also reduced to be approximately 40%. The so reduced light quantity especially increases noise at a low light level, which inevitably brings about a deterioration of image quality. To overcome the above problem, there is a need to make an exposure time of the sensor long. However, when the exposure time is increased, side effects due to handshaking are serious. That is, when the exposure time is long, a deterioration called blur occurs in the photographed image at the time of the occurrence of handshaking while the image is photographed. For the purpose of overcoming the above problem, an image stabilization technology is required. When the image stabilization technology is applied, the handshaking is calibrated during the photographing, and therefore even though the exposure time of the sensor is long, a clear image without noise may be photographed.

As the existing image stabilization technology, an actuator structure for photographing a clear image without noise as described above or an actuator driving technology has been mainly introduced.

SUMMARY

An aspect of the present disclosure may provide a system and a method for calibrating a camera capable of calibrating a decenter between an optical axis of a lens and a center of an image sensor.

According to an aspect of the present disclosure, a system for calibrating a camera may include: a memory storing centering calibration data reflecting a deviation of an optical axis of a lens; and an image signal processor determining an image recognition region of an image sensor based on the centering calibration data.

According to another aspect of the present disclosure, a method for calibrating a camera may include: storing centering calibration data reflecting a deviation of an optical axis of a lens in a memory; and processing an image signal input from the image sensor by determining an image recognition region of an image sensor based on the centering calibration data stored in the memory.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
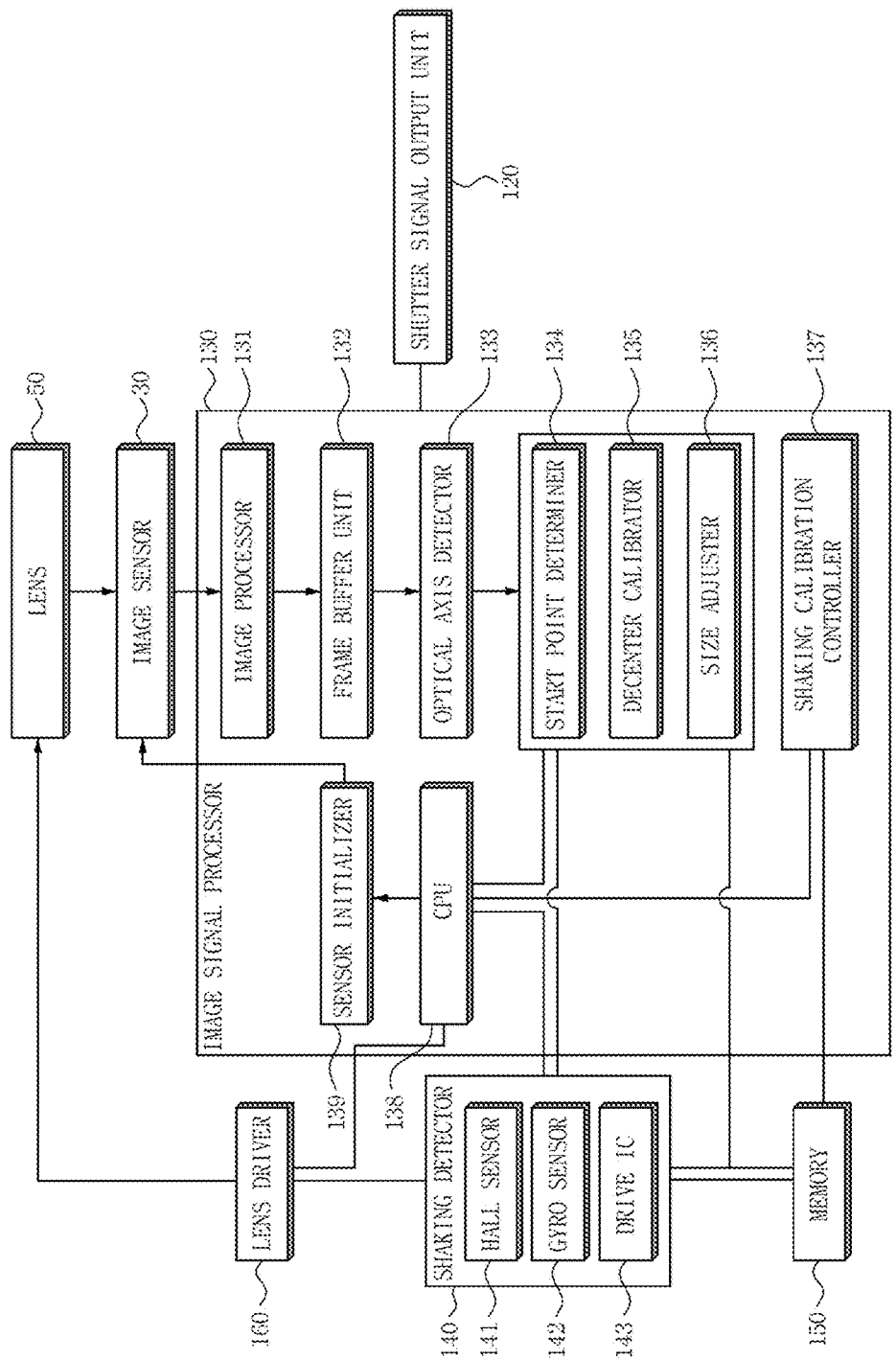
FIG. 1 is a configuration diagram illustrating a system for calibrating a camera according to an exemplary embodiment of the present disclosure.

The objects, features and advantages of the present disclosure will be more clearly understood from the following detailed description of the exemplary embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. Further, in the description of the present disclosure, when it is determined that the detailed description of the related art would obscure the gist of the present disclosure, the description thereof will be omitted.

Hereinafter, exemplary embodiments of the present disclosure will be described in detail with reference to the accompanying drawings.

FIG. 1 is a configuration diagram illustrating a system for calibrating a camera according to an exemplary embodiment of the present disclosure.

Referring to FIG. 1, a system for calibrating a camera according to an exemplary embodiment of the present disclosure includes a memory 150 and an image signal processor 130. Further, the system for calibrating a camera according to the exemplary embodiment of the present disclosure may further include a shutter signal output unit 120 and a shaking detector 140.

In more detail, the memory 150 is configured of a nonvolatile memory and keeps on storing centering calibration data even in the state in which a power supply of a camera is turned off. In this case, the memory 150 may be configured of, for example, an electrically erasable and programmable read only memory (EEPROM). However, a kind of memory 150 of the system for calibrating a camera according to the exemplary embodiment of the present disclosure is not limited thereto.

The shutter signal output unit 120 outputs a shutter signal corresponding to starting of a focusing operation or a photographing operation.

Further, the shutter signal output unit 120 outputs a first shutter signal corresponding to the starting of the focusing operation and a second shutter signal corresponding to the starting of the photographing operation.

Here, the shutter signal output unit 120 may mean a shutter release button which outputs an electrical signal corresponding to a photographing start and may be configured of, for example, a two-stage structure to generate the first shutter signal corresponding to a half-shutter and the second shutter signal corresponding to a full-shutter depending on a pressed degree of a photographer. However, the shutter signal output unit 120 of the system for calibrating a camera according to the exemplary embodiment of the present disclosure is not necessarily limited thereto.

The image signal processor 130 determines an image recognition region R2 of an image sensor 30 based on the centering calibration data stored in the memory 150 to process an image signal. Further, the image signal processor 130 may further include a shaking calibration controller 137 which controls shaking calibration of a lens 50 to control the shaking calibration of the lens 50. Here, for example, when the first shutter signal is output from the shutter signal output unit 120, the image signal processor 130 may determine the image recognition region R2 of the image sensor 30 based on the centering calibration data stored in the memory 150 and when the second shutter signal is output, may control the shaking calibration of the lens 50. However, the determination of the image recognition region R2 and the control of the shaking calibration of the lens 50 of the system for calibrating a camera according to the exemplary embodiment of the present disclosure each are not necessarily made only after the generation of the first shutter signal and the second shutter signal.

Further, the image signal processor 130 includes an optical axis detector 133, a start point determiner 134, a decenter calibrator 135, and a size adjuster 136.

Meanwhile, the centering calibration data include a start point coordinate value P1 by changing a start point of the image recognition region R2 recognized by the image sensor 30 as much as a deviation of an optical axis C1 from a center of the image sensor 30 by measuring the deviation D1 between the center C0 of the image sensor 30 and the optical axis C1 of the lens 50 prior to photographing and a central point coordinate value by changing a central point of the image recognition region R2 recognized by the image sensor 30 as much as the deviation of the optical axis C1 from the center of the image sensor 30.

Figure 2:
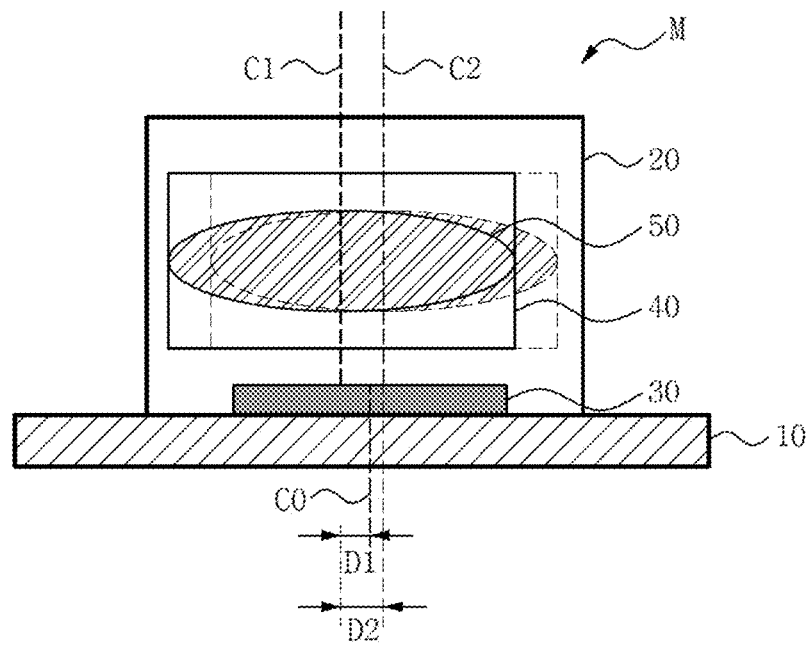
FIG. 2 is an exemplified diagram illustrating a camera module to which the system for calibrating a camera according to an exemplary embodiment of the present disclosure is applied.

FIG. 2 is an exemplified diagram illustrating a camera module to which the system for calibrating a camera according to an exemplary embodiment of the present disclosure is applied. Here, a camera module M illustrated in FIG. 2 includes the lens 50 for imaging a subject image on a photographed surface and the image sensor 30 for converting the subject image via the lens 50 into an electrical image signal. In this case, the camera module M is configured to include a barrel 40 having the lens 50 mounted therein, a printed circuit board (PCB) 10 mounted with the image sensor 30, and a housing 20 mounted in the printed circuit board (PCB) 10 with accommodating the barrel 40 and the image lens 50.

Referring to FIGS. 1 and 2, the optical axis detector 133 detects the optical axis C1 of the lens 50 depending on the shutter signal. Here, for example, when the first shutter signal is output, the optical axis detector 133 may detect the optical axis C1 depending on the first shutter signal, but the optical axis detector 133 of the system for calibrating a camera according to the exemplary embodiment of the present disclosure is not necessarily limited thereto. For example, the optical axis detector 133 may detect the optical axis C1 depending on the first shutter signal and the second shutter signal, respectively, or may detect the optical axis C1 depending on the second shutter signal.

The shaking detector 140 includes a hall sensor 141 which may detect positions of X and Y axes of the lens 50.

Further, the shaking detector 140 further includes a gyro sensor 142 sensing the shaking of the camera and a driver integrated circuit (IC) 143.

Here, the gyro sensor 142 senses the shaking of the camera and calculates a shaken amount by using a calculator (not illustrated). In this case, the calculator may be included in the shaking detector 140 or may be included outside the shaking detector 140 or inside the image signal processor 130.

In this case, the memory 150 in which the centering calibration data are stored may be included in the driver IC 143, but the system for calibrating a camera according to the exemplary embodiment of the present disclosure is not necessarily limited to the case in which the memory 150 in which the centering calibration data are stored is included in the driver IC 143, and therefore, for example, the memory 150 may be included separately from the shaking detector 140 including the driver IC 143 or the driver IC 143.

Here, the camera module M to which the system for calibrating a camera according to the exemplary embodiment of the present disclosure is applied may be configured of a shaking calibration camera module, but the exemplary embodiment of the present disclosure is not necessarily limited thereto but may also be applied to the camera module without the shaking calibration function.

Meanwhile, the system for calibrating a camera according to the exemplary embodiment of the present disclosure may include a lens driver 160 which drives the lens 50. Therefore, the image signal processor 130 may control the driving of the lens driver 160 depending on the shaking of the camera detected by the shaking detector 140 to calibrate the shaking of the lens 50.

Further, the lens driver 160 may be configured to include, for example, the housing 20, the barrel 40, and the actuator, but a configuration of the lens driver 160 of the system for calibrating a camera according to the exemplary embodiment of the present disclosure is not necessarily limited thereto. Further, the lens driver 160 may move the barrel 40 by using the actuator to move the lens 50 positioned inside the barrel 40 to a targeted position. Therefore, the lens driver 160 is controlled by the image signal processor 130 based on the determined image recognition region to move the lens 50, thereby calibrating the shaking of the lens 50. In this case, for example, the lens driver 160 may be controlled by the shaking detector 140 of the image signal processor 130, but the system for calibrating a camera according to the exemplary embodiment of the present disclosure is not necessarily limited thereto. As another example, the lens driver 160 may be controlled by the shaking detector 140 or a separate controller.

When an optical axis detection value detected by the optical axis detector 133 coincides with the central point coordinate value of the centering calibration data stored in the memory 150, the start point determiner 134 determines the image recognition start point of the image sensor 30 as the start point coordinate value P1 of the centering calibration data.

Figure 3:
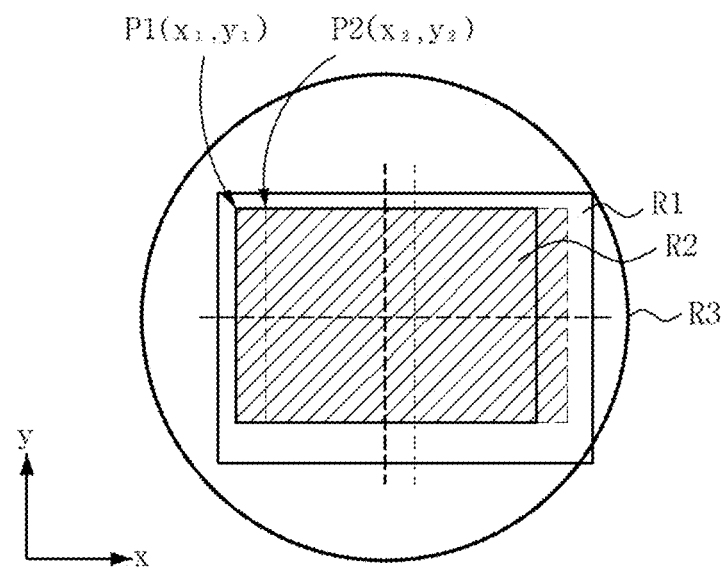
FIG. 3 is an exemplified diagram illustrating an image recognition region in the system for calibrating a camera according to an exemplary embodiment of the present disclosure.

FIG. 3 is an exemplified diagram illustrating an image recognition region in the system for calibrating a camera according to an exemplary embodiment of the present disclosure. Here, R3 illustrated in FIG. 3 indicates an effective diameter of the lens 50.

Referring to FIGS. 1 to 3, the decenter calibrator 135 adjusts the recognition start point of the image recognition region R2 when the optical axis C1 is changed.

Here, the decenter calibrator 135 adjusts the recognition start point of the image recognition region R2 when the optical axis C1 detection value detected by the optical axis detector 133 does not coincide with the central point coordinate value of the centering calibration data stored in the memory 150 but a difference between the optical axis C1 detection value and the central point coordinate value occurs. In this case, the decenter calibrator 135 adjusts the recognition start point of the image recognition region R2 as much as the difference between the optical axis C1 detection value and the central point coordinate value of the centering calibration data.

That is, when a decenter D2 occurs due to the difference between the optical axis C1 measured at the time of being stored in the memory 150 and the optical axis C2 measured by the optical axis detector 133, the decenter calibrator 135 changes the start point coordinate value P1 of the centering calibration data stored in the memory 150 as much as the decenter D2 amount to recognize the start point of the image recognition region R2 as the changed start point coordinate value P2, thereby calibrating the decenter D2.

Further, the decenter calibrator 135 may measure the additional change of the optical axis C2 by using the hall sensor 141 to additionally adjust the recognition start point of the image recognition region R2. In this case, the decenter calibrator 135 may estimate an additional change quantity of the optical axis C2 using a position detection value detecting the positions of the X and Y axes of the lens 50 by the hall sensor 141.

Referring to FIG. 1, in the system for calibrating a camera according to an exemplary embodiment of the present disclosure, the image signal processor 130 may further include an image processor 131 which receives the image from the image sensor 30 to process the image and a frame buffer unit 132 which stores the image value processed by the image processor 131. In this case, the optical axis detector 133 may detect the optical axis detection value for the optical axis of the lens 50 using an image value stored in the frame buffer unit 132, but the exemplary embodiment of the present disclosure is not limited thereto.

Further, in the system for calibrating a camera according to an exemplary embodiment of the present disclosure, the image signal processor 130 may further include a CPU (control calculator) 138 and a sensor initializer 139. In this case, after the photographing ends, the image sensor 30 may be initialized by the sensor initializer 139 using the CPU 138.

Referring to FIGS. 1 to 3, the size adjuster 136 adjusts a size of the image recognition region R2, compared with a size value of the image recognition region R2 stored in the memory 150.

Here, the size value of the image recognition region R2 stored in the memory 150 may be configured of the size value of the image recognition region R2 for the whole image photographing region R1. Here, the image recognition region R2 is configured of an effective image photographing region which is recognized by the image sensor 30.

Therefore, even when the size of the image sensor 30 needs to be widened depending on situations at the time of modifying and recognizing the image recognition region R2, the image recognition region R2 may be modified by adjusting the recognition size of the image recognition region R2 without widening the size of the image sensor 30.

In this case, the size adjuster 136 may adjust the size of the image recognition region R2 in the case in which a portion of the image recognition region R2 deviates from the whole image photographing region R1, when the optical axis C2 is changed and thus the recognition start point of the image recognition region R2 is adjusted by the decenter calibrator 135. However, the system for calibrating a camera according to an exemplary embodiment of the present disclosure is not limited to adjusting the size of the image recognition region R2 only when the size adjuster 136 adjusts the recognition start point of the image recognition region R2 using the decenter calibrator 135.

Referring to FIG. 2, the system for calibrating a camera according to an exemplary embodiment of the present disclosure configured as described above does not perform the centering operation of making the optical axis C1 of the lens 50 coincide with the center C0 of the image sensor 30 by driving the calibration apparatus for calibrating the deviation D1 of the optical axis C1 at the time of photographing, but may determine the start point coordinate value of the image recognition region recognized by the image sensor 30 based on the centering calibration data stored in the memory 150 to omit the centering mechanism operation using the separate calibration apparatus. Therefore, the system for calibrating a camera according to an exemplary embodiment of the present disclosure does not consume power which is generated at the time of driving the centering mechanism.

Figure 4:
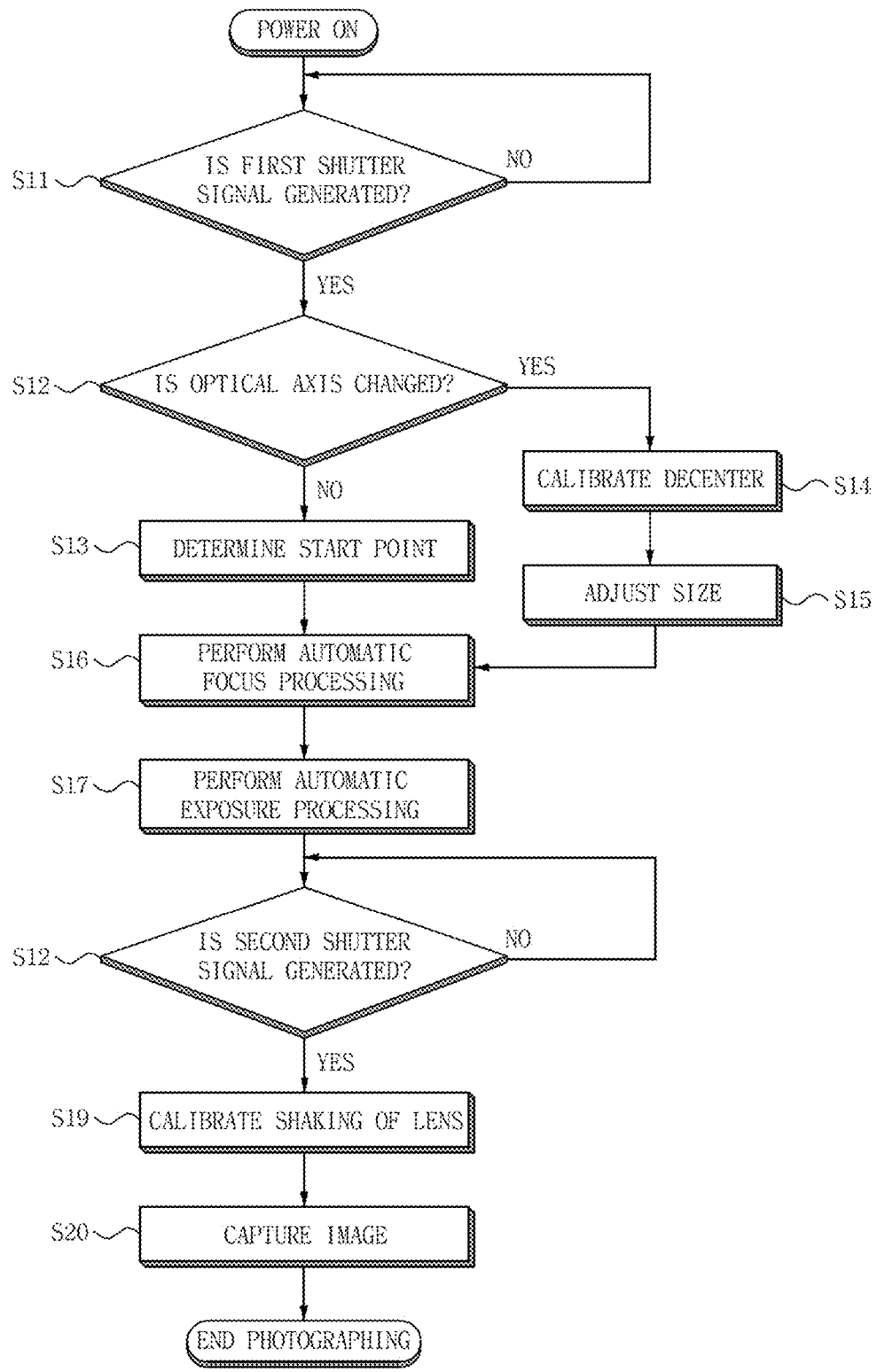
FIG. 4 is a flow chart showing a calibration method of the system for calibrating a camera according to an exemplary embodiment of the present disclosure.

FIG. 4 is a flow chart illustrating showing a calibration method of a system for calibrating a camera according to an exemplary embodiment of the present disclosure.

Hereinafter, a method for calibrating a camera according to an exemplary embodiment of the present disclosure will be described in more detail with reference to FIGS. 1 to 4.

Here, the method for calibrating a camera according to the exemplary embodiment of the present disclosure relates to a calibration method for the system for calibrating a camera according to the exemplary embodiment of the present disclosure.

The method for calibrating a camera according to the exemplary embodiment of the present disclosure includes storing a memory and processing an image signal. Further, the method for calibrating a camera according to the exemplary embodiment of the present disclosure may further include outputting a shutter signal.

In more detail, referring to FIGS. 1 to 3, in the storing of the memory, the centering calibration data reflecting the deviation of the optical axis C1 of the lens 50 prior to photographing are stored in the memory 150.

Further, the centering calibration data include the start point coordinate value P1 and the central point coordinate value.

Here, the start point coordinate value P1 is configured of a coordinate value obtained by changing the start point of the image photographing region recognized by the image sensor 30 as much as the deviation of the optical axis C1 from the center of the image sensor 30 by measuring the deviation between the center C0 of the image sensor 30 and the optical axis C1 of the lens 50 prior to photographing.

Further, the central point coordinate value is configured of a coordinate value obtained by changing the central point of the image recognition region R2 as much as the deviation of the optical axis C1 from the center of the image sensor 30 by measuring the deviation between the center C0 of the image sensor 30 and the optical axis C1 of the lens 50 prior to photographing.

Meanwhile, the memory 150 is configured of a nonvolatile memory and keeps on storing the centering calibration data even in the state in which the power supply of the camera is turned off. In this case, the memory 150 may be configured of, for example, the electrically erasable and programmable read only memory (EEPROM), but in method for calibrating a camera according to the exemplary embodiment of the present disclosure, a kind of memory 150 is not limited thereto.

Referring to FIGS. 1 and 4, in the outputting of the shutter signal, power is applied to the camera and then the shutter signal of the camera is output through the shutter signal output unit 120.

Further, the outputting of the shutter signal includes outputting the first shutter signal corresponding to the starting of the focusing operation (S11) and outputting the second shutter signal corresponding to the photographing stating (S18).

In the processing of the image signal, the image signal processor 130 determines the image recognition region R2 of the image sensor 30 based on the centering calibration data stored in the memory 150 to process the image signal input from the image sensor 30. In this case, in the processing of the image signal, after the image recognition region is determined, the shaking calibration of the lens 50 may be controlled.

Here, the processing of the image signal includes detecting the optical axis, determining the start point, calibrating the decenter, adjusting the size, and calibrating the shaking.

Referring to FIGS. 1, 2, and 4, in the detecting of the optical axis, when the shutter signal is generated, the optical axis detector 133 detects the optical axis C1 of the lens 50 (S12). Here, in the detecting of the optical axis, when the first shutter signal is generated, the optical axis C1 may be detected depending on the first shutter signal. However, the optical axis detection method of the method for calibrating a camera according to the exemplary embodiment of the present disclosure is not necessarily limited thereto, but for example, when the second shutter signal is output, may detect the optical axis C1.

Referring to FIGS. 1, 2, and 4, in the determining of the start point, when the optical axis detection value for the optical axis C1 of the lens 50 detected in the detecting of the optical axis coincides with the central point coordinate value of the centering calibration data, the recognition start point of the image recognition region R2 is determined as the start point coordinate value P1 of the centering calibration data (S13).

Meanwhile, referring to FIG. 1, the method for calibrating a camera according to the exemplary embodiment of the present disclosure includes detecting a lens linear position sensing the moving positions of the X and Y axes of the lens 50 using the hall sensor 141 of the shaking detector 140.

Here, the shaking detector 140 further includes the gyro sensor 142 sensing the shaking of the camera and the driver IC 143. Therefore, the method for calibrating a camera according to the exemplary embodiment of the present disclosure may further include detecting the shaking of the camera sensing the shaking of the camera using the gyro sensor 142.

Further, the memory 150 in which the centering calibration data are stored may be included in the driver IC 143, but the method for calibrating a camera according to the exemplary embodiment of the present disclosure is not necessarily limited to the case in which the memory 150 in which the centering calibration data are stored is included in the driver IC 143, and therefore, for example, the memory 150 may be included separately from the shaking detector 140 including the driver IC 143.

Referring to FIGS. 1 to 4, in the calibrating of the decenter, the recognition start point of the image recognition region R2 is adjusted when the optical axis C2 is changed (S14).

Here, in the calibrating of the decenter, the recognition start point of the image recognition region R2 is adjusted when the optical axis detection value detected in the detecting of the optical axis does not coincide with the central point coordinate value of the centering calibration data stored in the memory 150 but the difference between the optical axis detection value and the central point coordinate value occurs. In this case, the calibrating of the decenter, the recognition start point of the image recognition region R2 is adjusted as much as the difference between the optical axis detection value and the central point coordinate value of the centering calibration data.

That is, in the calibrating of the decenter, when the decenter D2 occurs due to the difference between the optical axis C1 measured at the time of being stored in the memory 150 and the optical axis C2 measured by the optical axis detector 133, the decenter calibrator 135 changes the start point coordinate value P1 of the centering calibration data stored in the memory 150 as much as the decenter D2 amount to recognize the start point of the image recognition region R2 as the changed start point coordinate value P2, thereby calibrating the decenter D2.

Further, in the calibrating of the decenter, the additional change of the optical axis C2 may be measured using the hall sensor 141 to additionally adjust the recognition start point of the image recognition region R2. In this case, the decenter calibrator 135 may estimate an additional change quantity of the optical axis C2 using a position detection value detecting the positions of the X and Y axes of the lens 50 by the hall sensor 141.

In the adjusting of the size, the size adjuster 136 adjusts the size of the image recognition region R2, compared with the size value of the image recognition region R2 stored in the memory 150 (S15).

Here, the size value of the image recognition region R2 stored in the memory 150 may be configured of the size value of the image recognition region R2 for the whole image photographing region R1. Here, the image recognition region R2 is configured of an effective image photographing region which is recognized by the image sensor 30.

Therefore, even when the size of the image sensor 30 needs to be widened depending on situations at the time of modifying and recognizing the image recognition region R2, the image recognition region R2 may be modified by adjusting the recognition size of the image recognition region R2 without widening the size of the image sensor 30.

In this case, for example, in the adjusting of the size, the size adjuster 136 may adjust the size of the image recognition region R2 in the case in which a portion of the image recognition region R2 deviates from the whole image photographing region R1, when the optical axis C2 is changed and thus the recognition start point of the image recognition region R2 is adjusted by the decenter calibrator 135. However, in the adjusting of the size of the method for calibrating a camera according to an exemplary embodiment of the present disclosure is not limited to adjusting the size of the image recognition region R2 only when the recognition start point of the image recognition region R2 is adjusted in the calibrating of the decenter.

Referring to FIGS. 1 and 4, in the calibrating of the shaking, the driving of the lens driver 160 is controlled by the shaking calibration controller 137 of the image signal processor 130 depending on the shaking detection value of the camera detected by the shaking detector 140 in the detecting of the shaking to calibrate the shaking of the lens 50 (S19).

In this case, for example, when the second shutter signal is output from the shutter signal output unit 120, the shaking of the lens 50 may be calibrated in the calibrating of the shaking, but the calibrating of the shaking of the method for calibrating a camera according to the exemplary embodiment of the present disclosure does not necessarily start only after the second shutter signal is output.

Referring to FIG. 4, the method for calibrating a camera according to the exemplary embodiment of the present disclosure detects (S12) the optical axis C1 via the detecting of the optical axis when the first shutter signal is generated (S11). Next, comparing the detected optical axis C1 with the centering calibrating data stored in the memory 150, the image recognition region is determined via the determining of the start point (S13) or the calibrating of the decenter (S14) and the adjusting of the size (S15). Further, the focus position is automatically adjusted by performing the automatic focus processing (S16) and automatic exposure processing (S17) is performed depending on the exposed light quantity. Next, when the second shutter signal is generated (S18), the shaking of the lens 50 is calibrated (S19) and the image is captured (S20) to end the photographing.

Referring to FIG. 2, the method for calibrating a camera according to an exemplary embodiment of the present disclosure configured as described above does not perform the centering calibrating operation using the apparatus making the optical axis of the lens 50 coincide with the center C0 of the image sensor 30 by driving the calibration apparatus for calibrating the deviation D1 of the optical axis C1 at the time of photographing, but may determine the start point coordinate value of the image recognition region recognized by the image sensor 30 based on the centering calibration data stored in the memory to omit the centering mechanism operation using the separate calibration apparatus. As a result, the method for calibrating a camera according to an exemplary embodiment of the present disclosure does not consume power which is generated at the time of driving the centering mechanism.

Although the embodiments of the present disclosure have been disclosed for illustrative purposes, it will be appreciated that the present disclosure is not limited thereto, and those skilled in the art will appreciate that various modifications, additions and substitutions are possible, without departing from the scope and spirit of the disclosure.

Accordingly, any and all modifications, variations or equivalent arrangements should be considered to be within the scope of the disclosure, and the detailed scope of the disclosure will be disclosed by the accompanying claims.

What is claimed is:

1. A system for calibrating a camera, comprising:
   a memory configured to store centering calibration data corresponding to a deviation of an optical axis of a lens; and
   an image signal processor configured to
   determine, during a photographing operation, an image recognition region of an image sensor, based on a difference between a position of the optical axis of the lens during the photographing operation and a position of the optical axis of the lens in the centering calibration data, without performing a centering operation that makes the optical axis of the lens coincide with a center of the image sensor, and
   process an image signal input from the image sensor.

2. The system of claim 1, wherein the centering calibration data comprise:
   a start point coordinate value, obtained by changing a start point of the image recognition region recognized by the image sensor by as much as a deviation of the optical axis from the center of the image sensor, the deviation being obtained by measuring, prior to photographing, a distance between the center of the image sensor and the optical axis of the lens.

3. The system of claim 2, wherein the centering calibration data comprise:
   a central point coordinate value, obtained by changing a central point of the image recognition region, by as much as the deviation of the optical axis from the center of the image sensor, the deviation being obtained by measuring, prior to photographing, the distance between the center of the image sensor and the optical axis of the lens.

4. The system of claim 3, wherein the image signal processor comprises:
   an optical axis detector configured to detect the optical axis of the lens.

5. The system of claim 4, wherein the image signal processor comprises:
   a start point determiner configured to determine a recognition start point of the image recognition region as the start point coordinate value of the centering calibration data, when an optical axis detection value detected by the optical axis detector coincides with the central point coordinate value of the centering calibration data stored in the memory.

6. The system of claim 5, wherein the image signal processor comprises:
   a decenter calibrator configured to adjust the recognition start point of the image recognition region, by as much as a difference between the optical axis detection value and the central point coordinate value of the centering calibration data, when the difference between the optical axis detection value detected by the optical axis detector and the central point coordinate value of the centering calibration data stored in the memory occurs.

7. The system of claim 6, further comprising:
   a shaking detector configured to measure a shaking of the lens.

8. The system of claim 7, wherein the shaking detector comprises:
   a hall sensor configured to sense moving positions of X and Y axes of the lens.

9. The system of claim 8, wherein the decenter calibrator is configured to additionally adjust the recognition start point of the image recognition region, by as much as the optical axis additionally changed, by detecting the change in the optical axis of the lens additionally changed using the hall sensor.

10. The system of claim 1, wherein the image signal processor comprises:
a size adjuster configured to adjust a size of the image recognition region.

11. The system of claim 10, wherein the size adjuster is configured to adjust a ratio to reduce the size of the image recognition region, when the image recognition region deviates from a whole image photographing region.

12. The system of claim 1, further comprising:
a shutter signal output unit outputting a shutter signal of the camera,
wherein the image signal processor is configured to determine the image recognition region, when the shutter signal is output.

13. The system of claim 12, wherein the image signal processor is configured to determine the image recognition region, when the shutter signal output unit outputs a first shutter signal corresponding to starting of a focusing operation or a second shutter signal corresponding to starting of a photographing operation.

14. The system of claim 1, wherein the memory is configured to continue storing the centering calibrating data even when a power supply of the camera is turned off and is configured of a nonvolatile memory.

15. A system for calibrating a camera, comprising:
a memory configured to store centering calibration data corresponding to a deviation of an optical axis of a lens; and
an image signal processor configured to
determine, during a photographing operation, an image recognition reg ion of an image sensor, based on a difference between a position of the optical axis of the lens during the photographing operation and a position of the optical axis of the lens in the centering calibration data, without performing a centering operation that makes the optical axis of the lens coincide with a center of the image sensor, and
control a shaking calibration of the lens, in order to process an image signal input from the image sensor.

16. The system of claim 15, further comprising:
a shutter signal output unit configured to output a first shutter signal corresponding to starting of a focusing operation and a second shutter signal corresponding to starting of a photographing operation,
wherein the image signal processor is configured to determine the image recognition region of the image sensor depending on the first shutter signal and controls the shaking calibration of the lens depending on the second shutter signal.

17. The system of claim 15, wherein the centering calibration data comprise:
a start point coordinate value obtained by changing a start point of the image recognition region recognized by the image sensor as much as a deviation of the optical axis from the center of the image sensor, the deviation being obtained by measuring, prior to photographing, a distance between the center of the image sensor and the optical axis of the lens.

18. The system of claim 17, wherein the centering calibration data further comprise:
a central point coordinate value obtained by changing a central point of the image recognition region recognized by the image sensor as much as the deviation of the optical axis from the center of the image sensor, the deviation being obtained by measuring, prior to photographing, the distance between the center of the image sensor and the optical axis of the lens.

19. The system of claim 18, wherein the image signal processor comprises:
an optical axis detector detecting the optical axis of the lens.

20. The system of claim 19, wherein the image signal processor comprises:
a start point determiner configured to determine an image recognition start point of the image sensor as the start point coordinate value of the centering calibration data, when an optical axis detection value detected by the optical axis detector coincides with the central point coordinate value of the centering calibration data stored in the memory.

21. The system of claim 19, wherein the image signal processor comprises:
a decenter calibrator configured to adjust a recognition start point of the image recognition region, by as much as a difference between the optical axis detection value and the central point coordinate value of the centering calibration data, when the difference between the optical axis detection value detected by the optical axis detector and the central point coordinate value of the centering calibration data stored in the memory occurs.

22. The system of claim 21, further comprising:
a shaking detector configured to measure a shaking of the lens.

23. The system of claim 22, wherein the shaking detector comprises:
a hall sensor configured to sense moving positions of X and Y axes of the lens.

24. The system of claim 23, wherein the decenter calibrator is configured to additionally adjust the start point of the image recognition region, by as much as the optical axis additionally changed, by detecting the change in the optical axis of the lens additionally changed using the hall sensor.

25. The system of claim 15, wherein the image signal processor comprises:
a size adjuster configured to adjust a size of the image recognition region.

26. The system of claim 25, wherein the size adjuster is configured to adjust a ratio to reduce the size of the image recognition region, when the image recognition region deviates from a whole image photographing region.

27. The system of claim 15, wherein the memory is configured to continue storing the centering calibrating data even when a power supply of the camera is turned off and is configured of a nonvolatile memory.

28. A method for calibrating a camera, comprising:
storing centering calibration data corresponding to a deviation of an optical axis of a lens in a memory; and
processing an image signal input from an image sensor by determining, during a photographing operation, an image recognition region of the image sensor, based on a difference between a position of the optical axis of the lens during the photographing operation and a position of the optical axis of the lens in the centering calibration data stored in the memory, without performing a centering operation that makes the optical axis of the lens coincide with a center of the image sensor.

29. The method of claim 28, wherein the centering calibration data comprise:
a start point coordinate value obtained by changing a start point of an image photographing region recognized by the image sensor as much as a deviation of the optical axis from the center of the image sensor, the deviation being obtained by measuring, prior to photographing, a distance between the center of the image sensor and the optical axis of the lens.

30. The method of claim 29, further comprising:
outputting a shutter signal of a camera,
wherein the image recognition region is determined when the shutter signal is output.

31. The method of claim 30, wherein the image recognition region is determined when, in the outputting of the shutter signal, a first shutter signal corresponding to starting of a focusing operation is output or a second shutter signal corresponding to starting of a photographing operation is output.

32. The method of claim 29, wherein the centering calibration data comprise:
a central point coordinate value obtained by changing a central point of the image recognition region, by as much as the deviation of the optical axis from the center of the image sensor, the deviation being obtained by measuring, prior to the photographing, the distance between the center of the image sensor and the optical axis of the lens.

33. The method of claim 32, wherein the processing of the image signal comprises:
detecting the optical axis of the lens.

34. The method of claim 33, wherein the processing of the image signal comprises:
determining a recognition start point of the image recognition region as the start point coordinate value of the centering calibration data, when an optical axis detection value detected in the detecting of the optical axis coincides with the central point coordinate value of the centering calibration data.

35. The method of claim 33, wherein the processing of the image signal comprises:
calibrating a decenter configured to adjust a recognition start point of the image recognition region, by as much as a difference between an optical axis detection value and the central point coordinate value of the centering calibration data, when a difference between the optical axis detection value detected in the detecting of the optical axis and the central point coordinate value of the centering calibration data occurs.

36. The method of claim 35, further comprising:
detecting a lens linear position, by sensing moving positions of X and Y axes of the lens, by using a hall sensor.

37. The method of claim 36, wherein in the calibrating of the decenter, the recognition start point of the image recognition region is configured to additionally adjust the recognition start point of the image recognition region, by as much as the optical axis additionally changed, by detecting the change in the optical axis of the lens additionally changed in the detecting of the lens linear position.

38. The method of claim 28, wherein the processing of the image signal comprises:
adjusting a size of the image recognition region.

39. The method of claim 38, wherein in the adjusting of the size of a ratio, by the image sensor, to reduce the size of the image recognition region, when the image recognition region deviates from a whole image photographing region.

40. The method of claim 28, wherein the memory is configured to continue storing the centering calibrating data even when a power supply of a camera is turned off.

41. A method for calibrating a camera, comprising:
storing centering calibration data corresponding to a deviation of an optical axis of a lens in a memory;
determining, during a photographing operation, an image recognition region of an image sensor, based on a difference between a position of the optical axis of the lens during the photographing operation and a position of the optical axis of lens in the centering calibration data stored in the memory, without performing a centering operation that makes the optical axis of the lens coincide with a center of the image sensor; and
controlling shaking calibration of the lens, in order to process an image signal input from the image sensor.

42. The method of claim 41, further comprising:
outputting a first shutter signal corresponding to starting of a focusing operation and outputting a second shutter signal corresponding to starting of a photographing operation, wherein the image recognition region of the image sensor is determined depending on the first shutter signal and the shaking calibration of the lens is controlled depending on the second shutter signal.

43. The method of claim 41, wherein the centering calibration data comprise:
a start point coordinate value obtained by changing a start point of an image photographing region recognized by the image sensor as much as a deviation of the optical axis from the center of the image sensor.

44. The method of claim 43, wherein the centering calibration data comprise:
a central point coordinate value obtained by changing a central point of the image recognition region, by as much as the deviation of the optical axis from the center of the image sensor, the deviation being obtained by measuring, prior to photographing, a distance between the center of the image sensor and the optical axis of the lens.

45. The method of claim 44, wherein the processing of the image signal comprises:
detecting the optical axis of the lens.

46. The method of claim 45, wherein the processing of the image signal comprises:
determining a recognition start point of the image recognition region as the start point coordinate value of the centering calibration data, when an optical axis detection value detected in the detecting of the optical axis coincides with the central point coordinate value of the centering calibration data.

47. The method of claim 45, wherein the processing of the image signal comprises:
calibrating a decenter configured to adjust a recognition start point of the image recognition region, by as much as a difference between an optical axis detection value and the central point coordinate value of the centering calibration data, when the difference between the optical axis detection value detected in the detecting of the optical axis and the central point coordinate value of the centering calibration data occurs.

48. The method of claim 47, further comprising:
detecting a lens linear position, by sensing moving positions of X and Y axes of the lens, by using a hall sensor.

49. The method of claim 48, wherein in the calibrating of the decenter, the recognition start point of the image recognition region is configured to additionally adjust the recognition start point of the image recognition region, by as much as the optical axis additionally changed, by detecting the change in the optical axis of the lens additionally changed in the detecting of the lens linear position.

50. The method of claim 41, wherein the processing of the image signal comprises:
adjusting a size of the image recognition region.

51. The method of claim 50, wherein in the adjusting of the size of a ratio, by the image sensor, to reduce the size of the image recognition region, when the image recognition region deviates from a whole image photographing region.

52. The method of claim 41, wherein the memory is configured to continue storing the centering calibrating data even when a power supply of a camera is turned off.

* * * * *